(12) United States Patent
Behrens

(10) Patent No.: US 7,107,466 B2
(45) Date of Patent: Sep. 12, 2006

(54) DATA STREAM SAFETY SWITCH

(76) Inventor: Mark Behrens, 10920 Fox Mill La., Charlotte, NC (US) 28277

( * ) Notice: Subject to any disclaimer, the term of this patent is extended or adjusted under 35 U.S.C. 154(b) by 624 days.

(21) Appl. No.: 10/098,986

(22) Filed: Mar. 15, 2002

(65) Prior Publication Data

US 2003/0177403 A1    Sep. 18, 2003

(51) Int. Cl.
*G06F 1/32* (2006.01)
(52) U.S. Cl. .............................................. 713/300
(58) Field of Classification Search ................. 713/300
See application file for complete search history.

(56) References Cited

U.S. PATENT DOCUMENTS

| 5,721,934 | A | * | 2/1998 | Scheurich | ................. 713/320 |
| 5,894,551 | A | * | 4/1999 | Huggins et al. | ............ 713/201 |
| 2002/0133747 | A1 | * | 9/2002 | Ravid | ......................... 714/20 |

* cited by examiner

*Primary Examiner*—John R. Cottingham
(74) *Attorney, Agent, or Firm*—Dennis Hanse

(57) ABSTRACT

A computer system having a power supply and several storage devices such as hard drives and CD writers, and a selection device or switch mechanism interposed between the power supply and the storage devices, the selection device being manually operable to selectively supply power from the power supply to one or more of the storage devices.

2 Claims, 1 Drawing Sheet

DATA STREAM SAFETY SWITCH

The present invention relates generally to computers and, more particularly, to computers with multiple data storage mechanisms and a switching device to protect the data stored on such mechanisms from corrupting influence, by being switched "off" while the computer is actually in use.

BACKGROUND OF THE INVENTION

1. Field of the Invention

Coincident with the meteoritic rise in the popularity of the computer to access the Internet in both the home and office environment, there has been a surge in the number of individuals that get some sort of vicarious thrill out of disrupting, or, more accurately, corrupting computer hard drives by way of a worm, or virus, which propagates itself and spreads wherever it can gain access. Many of these viruses, by way of example, reside on, or otherwise attach themselves to, any and all active computer drives and from there corrupt, or destroy, data and, coincidently, propagate themselves by sending themselves to recipients on the user's e-mail address list. Millions of dollars worth of losses have been felt worldwide as a consequence of such conduct.

By virtue of the existence of a number of operating systems and programs, which may have incompatible components, together with an ever increasing demand for storage space on such computers, many find it cost effective to mount more than one storage device, such as a hard drive, on a single CPU.

The addition of one or more storage devices, however, does not protect user data from corruption if, as is inevitably the case, the CPU comes under attack by a virus or worm. The only known way to positively protect a user's software programs, data and documents is by storing a backup copy on a secondary storage device, e.g., a second hard drive, and then somehow taking the secondary storage device out of the data stream.

When such a companion, or secondary storage, device is to be used on a single CPU, it is desirable to be able to selectively isolate the companion storage device(s) from outside influence, without inhibiting the user's ability to access the secondary drive(s) quickly and efficiently, as needed. It is within this environment that the present invention has particular utility, not only for isolating a storage device from Internet corruption, but also for isolating a storage device from a conventional network, for purposes of confidentiality, for example.

2. Description of the Prior Art

In light of the relatively recent origin of the problem, there have been few innovators in the computer field that have applied themselves to proposing a protection and backup solution which is effective, yet affordable, for the average user.

The state of the art and usual practice in virus protection is to have actively running in the background a virus protection program such as those available from McAfee, Norton, and, perhaps, others. These software makers focus their efforts on detecting viruses being spread on an ongoing basis, programming virus protection code into constantly revised "dat" files, and then making these "dat" files available to users for download, in order to upgrade their virus protection software programs to detect and mitigate the latest, offending viruses.

The obvious flaw in this scheme is that a virus has to have spread around, been detected, a fix created by these companies, and a download opportunity provided to subscribers. The user has to have downloaded the most current virus data file before his/her computer becomes infected by the then current virus in order to be protected from that particular virus.

As is well known, the most effective and malicious viruses spread so rapidly that many computers become infected before a fix is even made available and/or implemented by the user. Few users stay on top of downloading the most recent upgrades to ensure the best possible virus protection for their software. As evidenced by the constant upgrades to address the then current virus, virtually any software protection can still be defeated by a better virus. Indeed, it has become a game between those who would defend and those who would corrupt.

Harold J. Weber, in his U.S. Pat. No. 6,067,618, concerns himself with a CPU in which multiple hard disk drives are present, each of which may have a different operating system stored thereon. However, Weber seems preoccupied with prevention of cross talk, or binary, corruption between drives. In so doing, he avoids inter drive incongruities, by isolating each drive from every other in order that, inter alia, different users may neither simultaneously access one particular drive, nor access more than one of a multiplicity of drives. Weber's focus appears to be on isolating drives from each other such that 1) benefits of discrete and different operating systems may be enjoyed on the same computer, or 2) multiple users using the same computer cannot corrupt each other's data (as in a student environment) on the same computer using BIOS settings, electronic circuitry, etc. Weber's primary scheme is to switch "master" status of various drives which are physically installed on the same computer, and modify the BIOS to effectively ignore those drive(s) which do not have the "master" status.

SUMMARY OF THE INVENTION

The present invention is characterized by the provision of a relatively simple switching device, which may be either mechanical, electrical, electronic, or perhaps a combination, and by which multiple storage devices, such as hard drives, may be selectively activated for immediate use, while others are dormant, thus completely, safely isolated.

The focus of the present invention is the provision of a simple, affordable system accessory which is basic and fundamental, and offers a much less complicated solution to the isolation of two or more hard drives in the same CPU environment. The present invention is easily implemented by any user who has added a peripheral device, such as the additional hard drive, or a CD-ROM drive, or some other peripheral device.

Accordingly, it is an objective of the present invention to provide a computer user with a device that provides for the selective access to one or more of multiple storage devices. An objective consonant with the foregoing is to provide such a device which isolates a dormant drive(s) in such a manner that it is impervious to corruption from a potentially infected data stream.

The foregoing, as well as other objectives and advantages, will become apparent from a reading of the forthcoming Detailed Description of a Preferred Embodiment, in conjunction with the accompanying sheet of drawing, in which:

DETAILED DESCRIPTION OF A PREFERRED EMBODIMENT

Figure 1:
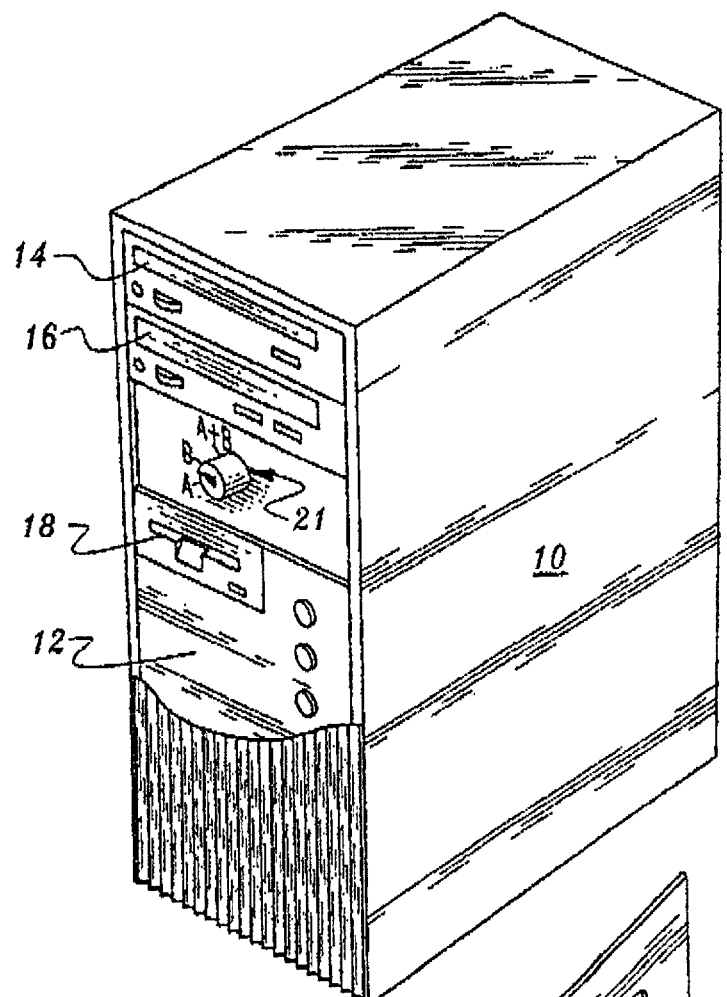
FIG. 1 is a pictorial representation of a typical CPU, incidentally shown in a tower configuration, and in which multiple storage devices in the nature of hard drives are mounted and in which access to such hard drives is readily controlled by the user by means of a switching device constructed in accordance with the present invention.

With reference now to the drawings, and initially to FIG. 1, a representative CPU tower is depicted at 10. The face 12 of the tower 10 is provided with a plurality of bays for the mounting of externally accessible peripherals, e.g., a CD-ROM 14, a CD-ROM Reader/Writer 16, and a floppy disk bay 18.

Figure 2:
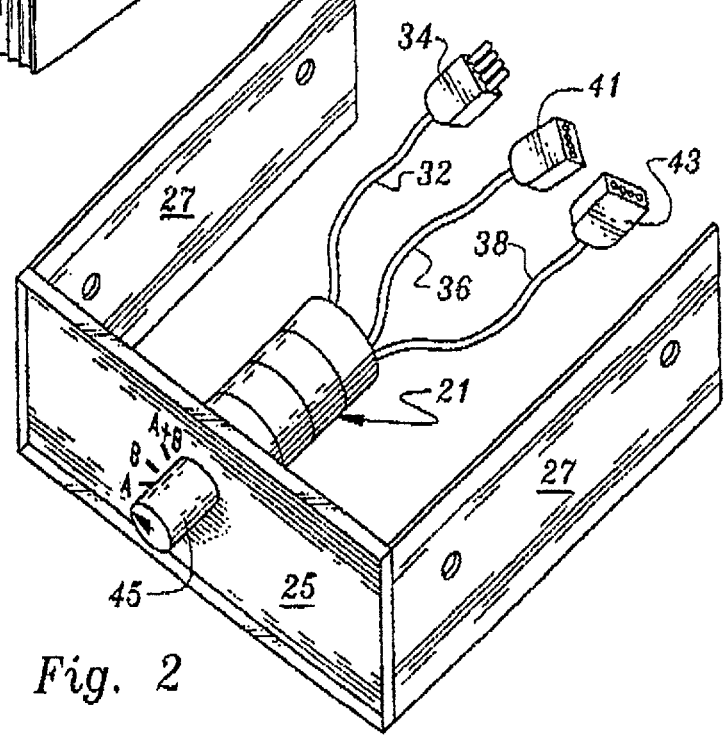
FIG. 2 is a perspective view of a switching device of the present invention, illustrating various features thereof.

Positioned in one of the externally accessible bays is a switching device 21, which is constructed in accordance with the present invention, and the details of which are seen in FIG. 2.

Referring now to FIG. 2, the switching device 21 is secured in a face plate 25, with mounting rails 27 flanking the face plate 25.

Securely mounted to the face plate 25 is, in accordance with the invention, a rotary switch 21. The rotary switch is of well known construction and no additional detail is necessary to its understanding. Moreover, the use of the aforesaid rotary switch is by way of example, and it will be appreciated by those skilled in the art that several different forms of switching devices, including, for example, a keyed access switching device, a pushbutton device, a toggle switch device, an electronic switching device, or an array of any of these, could readily be used in lieu of the switching device 21.

It is in keeping with the invention that the switching device 21 is electrically interposed between the power supply (not shown) for the computer, and the hard drives, none of which are illustrated in that they are well known elements in any computer. To this end a pigtail 32, terminating in a connector 34 is provided and connects between the computer's power supply through the switching device and a selected peripheral e.g., a hard drive, allowing power to be supplied separately to each, or selectively, to all of the drives simultaneously.

In a similar fashion, pigtails 36 and 38, each of which terminates in connectors 41 and 43, connect, respectively, to the usual power input connectors for the storage devices, typically hard drives, not shown. The switching device, in the illustrated example, has a shaft protruding through the face plate 25, and the end thereof is knurled or otherwise provided with a gripping member, such as, for example, knob 45 which permits the shaft to be readily rotated by the user's fingers between several switching positions, in order to selectively switch power on to any one or all of the storage devices. The faceplate 25 is conveniently marked to indicate which switch position powers up which drive(s).

In operation, the user determines the specific storage device(s) from which he or she wishes to work. The selector is then moved to the proper position, and, upon actuation of a main power switch on the computer case, power is supplied through the switching device 21 to the storage device(s) selected, the computer "boots up" and all other computer devices then operate in the prescribed manner.

Any storage device not selected remains powered down and, therefore, unable to send or receive data, or be corrupted from any source. The deselected storage device(s) are, thus, rendered impervious to any virus, worm or other form of digital conflict or intrusion that might otherwise result from other storage devices, internet corruption, or network access.

A particularly valuable feature of the invention is found in the ability to permit the user to perform, colloquially speaking, at the mere flip of a switch, 1) fast, convenient data backups, and 2) thereafter isolating this backed up data from corruption. This is accomplished, at any time, but typically during pre established "backup" periods, at the election of the user.

Another benefit of the present invention is in its capability to use, and select between, a multiplicity of hardware storage devices, such as hard drives, in a single computer housing or case, which becomes the functional equivalent of two or more apparently distinct computers. This can serve the purpose of allowing discrete users access to only their computer system without inadvertent access to the files of others.

Additionally, different operating systems and/or different software programs can be loaded onto each drive, as desired. If, however, the operating systems on all drives are not operationally compatible, the "backup" features of the preferred embodiment may be impaired, if not precluded entirely.

If operating systems selected are operationally compatible and both drives are exposed to the same virus files through Internet corruption, for example, on the same day during a "backup" sequence, when the selector switch 21 is set to power them both up, the data on each is placed at risk of virus corruption and maximum data security is lost.

This concern may be obviated by the provision of a third drive which is installed, but remains dormant, and the data stored thereon will be safe, in that there is never an event in which all drives are simultaneously exposed to data corruption. In this manner, it is contemplated that the system will perform, in accordance with the objectives of the present invention.

It will be appreciated that for the purposes of "backing up" data, both drives must be powered up simultaneously, and each drive would operate using the same, or compatible operating systems, such as Windows 95 and/or Windows 98, or others. In a preferred embodiment, the usual mode of operation would be with the "main" drive powered up, and the "backup" drive powered down for its data protection as described previously.

In a preferred embodiment, the "main" drive would be designated the "secondary" drive on the computer drive hierarchy. When it is the only drive powered up, it becomes the "primary" drive, on the computer drive hierarchy, by default. In a preferred embodiment, the "backup" drive would be designated the "primary" drive on the computer drive hierarchy. With only the "backup" drive powered up, only this drive would be accessible by the user. In a preferred embodiment, with both "main" and "backup" drives powered up, access can be had to data on the "main" drive and files copied over to the "backup" drive, as in performance of the backup operation. The "backup" drive is in control whenever both drives are powered up simultaneously, since it has "primary" status on the computer hierarchy.

Having now described a preferred embodiment of the present invention, and appreciating that some variation in the specific elements are within the contemplation of the invention,

The invention claimed is:

1. In a computer system, said system including a power supply, and multiple storage devices;

a selector switch, said switch being interconnected between said computer power supply and each of said storage devices; said switch being movable by the user between several positions to supply power to selected one(s) of said storage devices to activate the same, said storage devices to which power is not supplied remaining dormant;

wherein said selector switch is manually operable to supply power to at least one but less than all of said storage devices, wherein all said powered up storage devices can communicate with each other.

2. In a computer system, said system including a power supply, and multiple storage devices;

a selector switch, said switch being interconnected between said computer power supply and each of said storage devices; said switch being movable by the user between several positions to supply power to selected one(s) of said storage devices to activate the same, said storage devices to which power is not supplied remaining dormant;

wherein said selector switch interconnects said power supply to all of said storage devices, wherein all said powered up storage devices can communicate with each other.

* * * * *